United States Patent
Yan et al.

(10) Patent No.: US 10,062,268 B2
(45) Date of Patent: Aug. 28, 2018

(54) TERMINAL ALARM METHOD AND APPARATUS

(71) Applicant: ZTE CORPORATION, Guangdong (CN)

(72) Inventors: Haiqing Yan, Guangdong (CN); Tao Xue, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 15/568,620

(22) PCT Filed: May 25, 2015

(86) PCT No.: PCT/CN2015/079745
§ 371 (c)(1),
(2) Date: Oct. 23, 2017

(87) PCT Pub. No.: WO2016/169095
PCT Pub. Date: Oct. 27, 2016

(65) Prior Publication Data
US 2018/0158311 A1 Jun. 7, 2018

(30) Foreign Application Priority Data
Apr. 23, 2015 (CN) .......................... 2015 1 0197959

(51) Int. Cl.
*G08B 25/01* (2006.01)
*G06K 9/00* (2006.01)
*G08B 25/00* (2006.01)

(52) U.S. Cl.
CPC ....... *G08B 25/016* (2013.01); *G06K 9/00013* (2013.01); *G06K 9/00087* (2013.01); *G08B 25/001* (2013.01)

(58) Field of Classification Search
CPC ................ G08B 25/016; G08B 25/001; G06K 9/00013; G06K 9/00087
See application file for complete search history.

(56) References Cited

U.S. PATENT DOCUMENTS

2009/0282258 A1 11/2009 Burke et al.

FOREIGN PATENT DOCUMENTS

| CN | 104223616 A | 12/2014 |
|---|---|---|
| EP | 2 226 741 A1 | 9/2010 |
| EP | 2 230 623 A1 | 9/2010 |

OTHER PUBLICATIONS

International Search Report dated Jan. 27, 2016 issued in PCT/CN2015/079745.
European Extended Supplementary Search Report dated Apr. 6, 2018 received in European Patent Application No. 15 88 9584.7.

*Primary Examiner* — Sisay Yacob
(74) *Attorney, Agent, or Firm* — Scully Scott Murphy & Presser

(57) ABSTRACT

The present disclosure provides a terminal alarm method and device. The method comprises: receiving (S102) a pressing operation of a finger corresponding to a first fingerprint at a touch position for recognizing the first fingerprint, the first fingerprint matching a fingerprint previously stored locally in the terminal, and triggering (S104) an alarm function of the terminal, when the pressing duration time of the pressing operation reaches a predetermined time period and/or the number of pressing times of the pressing operation reaches a predetermined number of times. The present disclosure solves the problem that the function of the fingerprint recognition is monotonous in the related art and improves the user experience.

8 Claims, 4 Drawing Sheets

TERMINAL ALARM METHOD AND APPARATUS

CROSS REFERENCE

This application is an US national phase of International Application No. PCT/CN2015/079745, filed on May 25, 2015, which is based upon and claims priority to Chinese Patent Application No. 201510197959.3, filed on Apr. 23, 2015, and the entire contents thereof are incorporated herein by reference.

TECHNICAL FIELD

The present disclosure relates to the field of communication, and more particularly, to an alarm method and an alarm device for a terminal.

BACKGROUND

In the related art, fingerprints are only utilized for fingerprint recognition function through fingerprint sensors. That is, when fingerprint recognition is not passed, it is treated as an alarm event that the mobile phone has been stolen. Or, with a fingerprint recognition device communicated with other device, it may achieve a purpose of alarm against stealing. However, the related art does not involve secret alarm implemented through a fingerprint sensor of a terminal when the owner of the terminal is in emergency.

Regarding the problem that the function of the fingerprint recognition is monotonous in the related art, no effective solution has been put forward.

SUMMARY

A main object of the embodiments of the present disclosure is to provide an alarm method for a terminal and an alarm device for a terminal, to at least solve the problem that the function of the fingerprint recognition is monotonous in the related art.

According to an embodiment of the present disclosure, there is provided an alarm method for a terminal, comprising: receiving a pressing operation by a finger corresponding to a first fingerprint at a touch position for recognizing the first fingerprint, the first fingerprint matching with a fingerprint previously stored locally in the terminal; and triggering an alarm function of the terminal when the pressing duration time of the pressing operation reaches a predetermined time period, and/or the number of pressing times of the pressing operation reaches a predetermined number of times.

In an embodiment of the present disclosure, triggering an alarm function of the terminal when the pressing duration time of the pressing operation reaches a predetermined time period, and/or the number of pressing times of the pressing operation reaches a predetermined number of times, comprises: when the pressing duration time reaches the predetermined time period, depending on the value of the pressing duration time, triggering an alarm function corresponding to the pressing duration time; and/or when the number of the pressing times is greater than the predetermined number of times, depending on the value of the number of the pressing times, triggering an alarm function corresponding to the number of the pressing times.

In an embodiment of the present disclosure, depending on the value of the pressing duration time, triggering an alarm function corresponding to the pressing duration time, comprises: when the pressing duration time is within a range of a first time period, triggering the terminal to send a current position message and an emergency SOS message to a preset first designated receiving party, and triggering a voice recording function of the terminal; when the pressing duration time is within a range of a second time period, further triggering the terminal to start a camera, and send video information captured by the camera to the designated receiving party; and when the pressing duration time is within a range of a third time period, further triggering the terminal to send current position messages and emergency SOS messages to a plurality of preset designated receiving parties.

In an embodiment of the present disclosure, depending on the value of the number of the pressing times, triggering an alarm function corresponding to the number of the pressing times, comprises: when the number of the pressing times is within a range of a first threshold, triggering the terminal to send a current position message and an emergency SOS message to a preset first designated receiving party, and triggering a voice recording function of the terminal; when the number of the pressing times is within a range of a second threshold, further triggering the terminal to start a camera, and send video information captured by the camera to the designated receiving party; and when the number of the pressing times is within a range of a third threshold, further triggering the terminal to send current position messages and emergency SOS messages to a plurality of preset designated receiving parties.

In an embodiment of the present disclosure, prior to triggering the alarm function of the terminal, the method comprises: when the pressing duration time of the pressing operation reaches the predetermined time period, and/or the number of pressing times of the pressing operation reaches the predetermined number of times, prompting the user whether to proceed the pressing operation by a predetermined operation.

According to another embodiment of the present disclosure, there is provided an alarm device for a terminal, comprising: a receiving module configured to receive a pressing operation by a finger corresponding to a first fingerprint at a touch position for recognizing the first fingerprint, the first fingerprint matching with a fingerprint previously stored locally in the terminal; and an alarm module configured to trigger an alarm function of the terminal when the pressing duration time of the pressing operation reaches a predetermined time period, and/or the number of pressing times of the pressing operation reaches a predetermined number of times.

In an embodiment of the present disclosure, the alarm module is further configured to, when the pressing duration time reaches the predetermined time period, depending on the value of the pressing duration time, trigger an alarm function corresponding to the pressing duration time; and/or when the number of the pressing times is greater than the predetermined number of times, depending on the value of the number of the pressing times, trigger an alarm function corresponding to the number of the pressing times.

In an embodiment of the present disclosure, the alarm module comprises: a first alarm unit configured to, when the pressing duration time is within a range of a first time period, trigger the terminal to send a current position message and an emergency SOS message to a preset first designated receiving party, and trigger a voice recording function of the terminal; a second alarm unit configured to, when the pressing duration time is within a range of a second time period, further trigger the terminal to start a camera, and send video information captured by the camera to the designated receiving party; and a third alarm unit configured to, when the pressing duration time is within a range of a third time period, further trigger the terminal to send current position messages and emergency SOS messages to a plurality of preset designated receiving parties.

In an embodiment of the present disclosure, the alarm module comprises: a fourth alarm unit configured to, when the number of the pressing times is within a range of a first threshold, trigger the terminal to send a current position message and an emergency SOS message to a preset first designated receiving party, and trigger a voice recording function of the terminal; a fifth alarm unit configured to, when the number of the pressing times is within a range of a second threshold, further trigger the terminal to start a camera, and send video information captured by the camera to the designated receiving party; and a sixth alarm unit configured to, when the number of the pressing times is within a range of a third threshold, further trigger the terminal to send current position messages and emergency SOS messages to a plurality of preset designated receiving parties.

In an embodiment of the present disclosure, prior to triggering the alarm function of the terminal, the device further comprises: a prompt module configured to, when the pressing duration time of the pressing operation reaches the predetermined time period, and/or the number of pressing times of the pressing operation reaches the predetermined number of times, prompt the user whether to proceed the pressing operation by a predetermined operation.

In the embodiments of the present embodiment, a pressing operation by a finger corresponding to a first fingerprint at a touch position for recognizing the first fingerprint is received, the first fingerprint matching with a fingerprint previously stored locally in the terminal; and an alarm function of the terminal is triggered when the pressing duration time of the pressing operation reaches a predetermined time period, and/or the number of pressing times of the pressing operation reaches a predetermined number of times. In this way, in the present disclosure, the alarm function of the terminal may be initiatively triggered by the fingerprint recognition. It may solve the problem that the function of the fingerprint recognition is monotonous in the related art, and improve the user experience.

BRIEF DESCRIPTION OF THE DRAWINGS

The accompanying drawings described herein are provided to present a further understanding of the present disclosure, and constitute a part of the present application. The illustrative embodiments of the present disclosure and its description are intended to be illustrative of the present disclosure and are not to be construed as limiting the present disclosure. In the drawings.

DETAILED DESCRIPTION

It is to be noted that the embodiments and the features in the embodiments in the present disclosure may be combined with each other without conflict. Hereinafter, the present disclosure will be described in detail with reference to the accompanying drawings.

Figure 1:
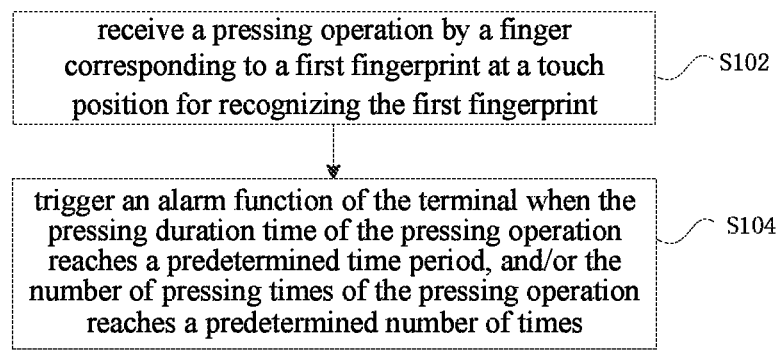
FIG. 1 is a flow chart illustrating an alarm method for a terminal according to an embodiment of the present disclosure.

In the present embodiment there is provided an alarm method for a terminal. FIG. 1 is a flow chart illustrating an alarm method for a terminal according to an embodiment of the present disclosure. As shown in FIG. 1, the process includes the following steps.

In step S102, a pressing operation by a finger corresponding to a first fingerprint at a touch position for recognizing the first fingerprint is received, the first fingerprint matching with a fingerprint previously stored locally in the terminal.

In step S104, an alarm function of the terminal is triggered when a pressing duration time of the pressing operation reaches a predetermined time period, and/or a number of pressing times of the pressing operation reaches a predetermined number of times.

Through the step S102 and step S104 in the present embodiment, a pressing operation by a finger corresponding to a first fingerprint at a touch position for recognizing the first fingerprint is received, the first fingerprint matching with a fingerprint previously stored locally in the terminal; and an alarm function of the terminal is triggered when a pressing duration time of the pressing operation reaches a predetermined time period, and/or a number of pressing times of the pressing operation reaches a predetermined number of times. In this way, in the present embodiment, the alarm function of the terminal may be initiatively triggered by the fingerprint recognition. It may solve the problem that the function of the fingerprint recognition is monotonous in the related art, and improve the user experience.

In an alternative embodiment of the present embodiment, triggering an alarm function of the terminal when a pressing duration time of the pressing operation reaches a predetermined time period, and/or a number of pressing times of the pressing operation reaches a predetermined number of times involved in the step S104 of the present embodiment may be implemented through the following steps.

In step S11: when the pressing duration time reaches the predetermined time period, depending on a value of the pressing duration time, an alarm function corresponding to the pressing duration time is triggered; and/or In step S12: when the number of the pressing times is greater than the predetermined number of times, depending on a value of the number of the pressing times, an alarm function corresponding to the number of the pressing times is triggered.

That is, through the above steps S11 and S12, depending on different degrees of the pressing duration time and different values of the number of the pressing times, different alarm functions may be triggered. In an alternative embodiment of the present embodiment, triggering different alarm functions depending on different degrees of the pressing duration time and different values of the number of the pressing times may be implemented through the following steps.

That is, depending on a value of the pressing duration time, triggering an alarm function corresponding to the pressing duration time when the pressing duration time reaches the predetermined time period, may be implemented through the following steps.

In step S21: when the pressing duration time is within a range of a first time period, the terminal is triggered to send a current position message and an emergency SOS message to a preset first designated receiving party, and a voice recording function of the terminal is triggered.

In step S22, when the pressing duration time is within a range of a second time period, the terminal is further triggered to start a camera, and send video information captured by the camera to the designated receiving party.

In step S23, when the pressing duration time is within a range of a third time period, the terminal is further triggered to send current position messages and emergency SOS messages to a plurality of preset designated receiving parties.

It is to be noted that the above-mentioned three steps S21 to S23 are progressive. That is, after the completion of the alarm function in step S21, the alarm function in steps S22 and S23 may be triggered if the pressing duration time continues to increase.

Depending on a value of the number of the pressing times, triggering an alarm function corresponding to the number of the pressing times may be implemented through the following steps.

In step S31: when the number of the pressing times is within a range of a first threshold, the terminal is triggered to send a current position message and an emergency SOS message to a preset first designated receiving party, and a voice recording function of the terminal is triggered.

In step S32, when the number of the pressing times is within a range of a second threshold, the terminal is further triggered to start a camera, and send video information captured by the camera to the designated receiving party.

In step S33, when the number of the pressing times is within a range of a third threshold, the terminal is further triggered to send current position messages and emergency SOS messages to a plurality of preset designated receiving parties.

Similar to the above-described steps S21 to S23, the above steps S31 to S33 are also progressive.

In one of the application scenarios of the present alternative embodiment, the above-described steps S21 to S23, and the steps S31 to S33 may be:

(1) The pressing duration time is determined, and an alarm function of a corresponding level is started.

When the pressing is continued for 2 seconds, an alarm is started by automatically sending a positioning message and an emergency voice recording message.

When the pressing is further continued for 3 seconds, additional alarm is performed by starting the camera to capture the ambient environment and sending the captured video in real time.

When the pressing is further continued for 4 seconds, additional alarm is performed by automatically calling several designated emergency contacts.

It should be noted that in this application scenario, the range of the first time period, the range of the second time period and the range of the third time period are values of time instances, respectively 2 s, 3 s and 4 s. However, in other application scenario, the range of the first time period, the range of the second time period and the range of the third time period may be respective 2-4 s, 4 s-6 s and 6 s-8 s.

(2) The number of the pressing times is determined, and an alarm function of a corresponding level is started.

When the pressing is performed for two times, an alarm is started by automatically sending a positioning message and an emergency voice recording message.

When the pressing is performed for another three times, additional alarm is performed by starting the camera to capture the ambient environment and sending the captured video in real time.

When the pressing is performed for yet another four times, additional alarm is performed by automatically calling several designated contacts or sending a short message simultaneously to several designated contacts.

It should be noted that in this application scenario, the range of the first threshold, the range of the second threshold and the range of the third threshold are respectively 2, 3 and 4 times. However, in other application scenario, the range of the first threshold, the range of the second threshold and the range of the third threshold may be respective 2-4 times, 5-7 times and 8-10 times.

In another alternative embodiment of the present embodiment, the method of the present embodiment may further include: prior to triggering the alarm function of the terminal, when a pressing duration time of the pressing operation reaches the predetermined time period, and/or a number of pressing times of the pressing operation reaches the predetermined number of times, the user is prompted whether to proceed the pressing operation by a predetermined operation.

In this way, it may avoid the alarm function is started by mal-operation of the user. The preset operation may be the terminal continuously vibrating for several seconds, or the terminal starting a flashlight of the camera at a certain frequency. However, e, this is only examples, the user may be prompted by other preset operation.

In the present embodiment, there is also provided an alarm device for a terminal for implementing the above-described embodiments and the alternative embodiments. The description already given will not be repeated again. As used herein, the term "module", "unit" may implemented by a combination of software and/or hardware of a predetermined function. Although the devices described in the following embodiments are preferably implemented in software, the implementation of hardware, or a combination of software and hardware, is also possible and envisioned.

Figure 2:
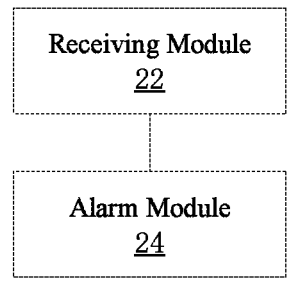
FIG. 2 is a block diagram illustrating an alarm device for a terminal according to an embodiment of the present disclosure.

FIG. 2 is a block diagram illustrating an alarm device for a terminal according to an embodiment of the present disclosure. As shown in FIG. 2, the device includes: a receiving module 22 configured to receive a pressing operation by a finger corresponding to a first fingerprint at a touch position for recognizing the first fingerprint, the first fingerprint matching with a fingerprint previously stored locally in the terminal; and an alarm module 24 coupled to the receiving module 22 and configured to trigger an alarm function of the terminal when a pressing duration time of the pressing operation reaches a predetermined time period, and/or a number of pressing times of the pressing operation reaches a predetermined number of times.

Alternatively, the alarm module 24 is also configured to, when the pressing duration time reaches the predetermined time period, depending on a value of the pressing duration time, trigger an alarm function corresponding to the pressing duration time; and/or when the number of the pressing times is greater than the predetermined number of times, depending on a value of the number of the pressing times, trigger an alarm function corresponding to the number of the pressing times.

Figure 3:
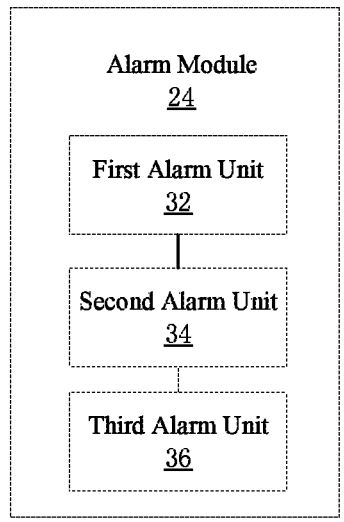
FIG. 3 is a first alternative block diagram illustrating an alarm device for a terminal according to an embodiment of the present disclosure.

FIG. 3 is a first alternative block diagram illustrating an alarm device for a terminal according to an embodiment of the present disclosure. As shown in FIG. 3, the alarm module 24 includes: a first alarm unit 32 configured to, when the pressing duration time is within a range of a first time period, trigger the terminal to send a current position message and an emergency SOS message to a preset first designated receiving party, and trigger a voice recording function of the terminal; a second alarm unit 34 coupled to the first alarm unit 32 and configured to, when the pressing duration time is within a range of a second time period, further trigger the terminal to start a camera, and send video information captured by the camera to the designated receiving party; and a third alarm unit 36 coupled to the second alarm unit 34 and configured to, when the pressing duration time is within a range of a third time period, further trigger the terminal to send current position messages and emergency SOS messages to a plurality of preset designated receiving parties.

Figure 4:
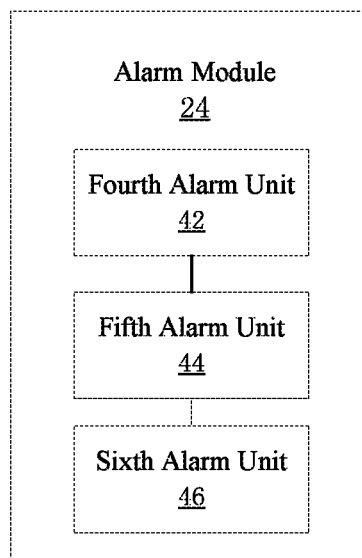
FIG. 4 is a second alternative block diagram illustrating an alarm device for a terminal according to an embodiment of the present disclosure.

FIG. 4 is a second alternative block diagram illustrating an alarm device for a terminal according to an embodiment of the present disclosure. As shown in FIG. 4, the alarm module 24 includes: a fourth alarm unit 42 configured to, when the number of the pressing times is within a range of a first threshold, trigger the terminal to send a current position message and an emergency SOS message to a preset first designated receiving party, and trigger a voice recording function of the terminal; a fifth alarm unit 44 coupled to the fourth alarm unit 42 and configured to, when the number of the pressing times is within a range of a second threshold, further trigger the terminal to start a camera, and send video information captured by the camera to the designated receiving party; and a sixth alarm unit 46 coupled to the fifth alarm unit 44 and configured to, when the number of the pressing times is within a range of a third threshold, further trigger the terminal to send current position messages and emergency SOS messages to a plurality of preset designated receiving parties.

Figure 5:
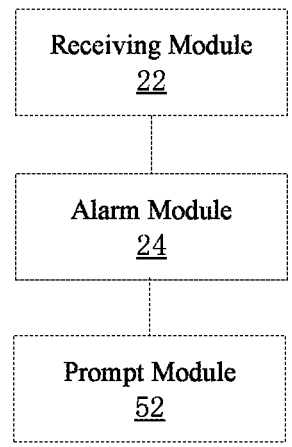
FIG. 5 is a third alternative block diagram illustrating an alarm device for a terminal according to an embodiment of the present disclosure.

FIG. 5 is a third alternative block diagram illustrating an alarm device for a terminal according to an embodiment of the present disclosure. As shown in FIG. 5, prior to triggering the alarm function of the terminal, the device may also include a prompt module 52 coupled to the alarm module 24, and configured to, when a pressing duration time of the pressing operation reaches the predetermined time period, and/or a number of pressing times of the pressing operation reaches the predetermined number of times, prompt the user whether to proceed the pressing operation by a predetermined operation.

The present disclosure will now be illustrated with reference to an alternative embodiment of the present disclosure.

The present alternative embodiment provides a fingerprint emergency positioning and alarm method and device. In an emergency situation, the user may perform fingerprint emergency positioning and alarm through the fingerprint sensor, thus improving the user experience.

Figure 6:
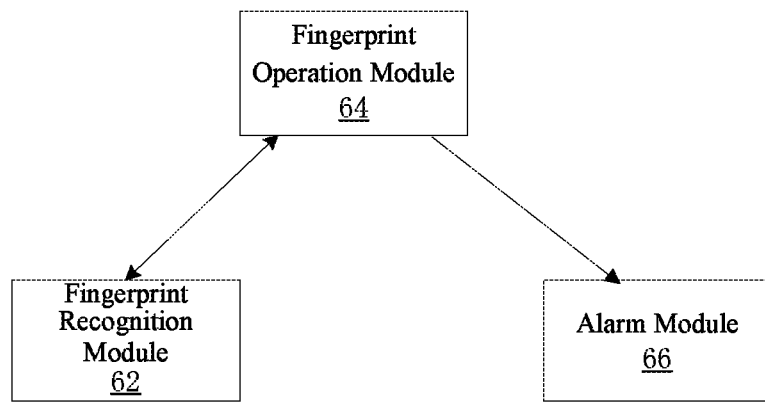
FIG. 6 is a block diagram illustrating a fingerprint emergency positioning and alarm device according to an alternative embodiment of the present disclosure.

FIG. 6 is a block diagram illustrating a fingerprint emergency positioning and alarm device according to an alternative embodiment. As shown in FIG. 6, the device includes:

a fingerprint recognition module 62 configured to perform fingerprint recognition, that is, to compare the current acquired fingerprint features with background-recorded fingerprint features to determine whether they are matched, and when they are matched, report the result to a fingerprint operation module.

When the finger starts to press, firstly the fingerprint recognition is performed. After the fingerprint recognition is verified, the device includes: a fingerprint operation module 64 configured to recognize a fingerprint pressing operation; and trigger a corresponding level of alarm according to a duration time or a number of times of the fingerprint pressing. With the duration time or the number of times of the fingerprint pressing is increased, the level of alarm is gradually increased, and different alarm functions may be triggered according to different levels.

For example, when the pressing is continued for 2 s, a positioning message and an emergency voice recording message are automatically sent; when the pressing is continued for 3 s, the camera is started to capture the ambient environment and the captured video is sent in real time; when the pressing is further continued for 4 s, several designated emergency contacts are automatically called; when the pressing is performed for two times, a positioning message and an emergency voice recording message are automatically sent; when the pressing is performed for three times, the camera is started to capture the ambient environment and the captured video is sent in real time; and when the pressing is performed for four times, several designated contacts are automatically called or a short message is automatically sent simultaneously to the several designated contacts.

The device includes: an alarm module 66 configured to invoke different modules to perform different levels of alarm according to the pressing operation, to start a GPS positioning device, to start a voice recorder, to start a camera, to start voice dialing device to perform alarm; and to initiate calling successively according to numbers of the preset emergency contacts (which requires emergency contact setting) until the calling is put through, and to send a short message simultaneously to all of the emergency contacts (which requires setting of the contents of the short message).

Figure 7:
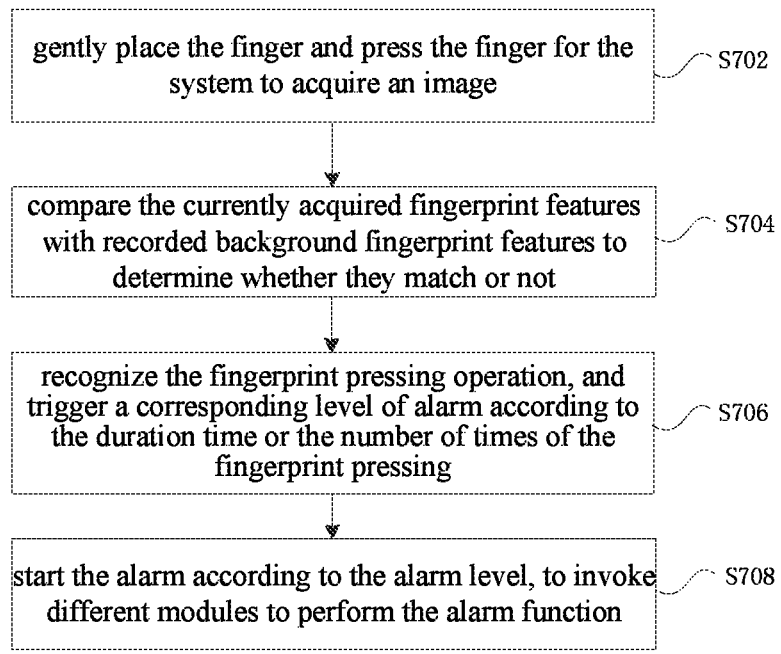
FIG. 7 is a flow chart of a method illustrating a fingerprint emergency positioning and alarm method according to an alternative embodiment of the present disclosure.

FIG. 7 is a flow chart illustrating a fingerprint emergency positioning and alarm method according to an alternative embodiment of the present disclosure. As shown in FIG. 7, the method includes the following steps.

In step S702, the finger is gently placed and pressed for the system to acquire an image.

In step S704, the currently acquired fingerprint features are compared with recorded background fingerprint features to determine whether they match or not.

The acquired fingerprint and a registered fingerprint are matched one by one. The fingerprint features acquired currently are compared with the fingerprint features stored in the fingerprint library to determine whether they belong to the same fingerprint. It may be roughly determined based on the print shape of the fingerprint, and then precisely compared based on the configuration and details of the fingerprint, to provide a score of the similarity of the two fingerprints. The scores of the similarity of fingerprints are sorted, or a determination result as whether they are the same fingerprint is provided.

It may be implemented through the following steps.

In step S71: an image of a fingerprint to be recognized is acquired by a fingerprint acquisition device.

In step S72: The acquired fingerprint image is preprocessed as follows: (1) image quality judgment; (2) image enhancement; (3) fingerprint region detection; (4) fingerprint pattern and frequency estimation; (5) image binarization (the gray value of each pixel in the fingerprint image is set to 0 or 255); and (6) image refinement.

In step S73: ridge data of the fingerprint is obtained from the pre-processed image; and feature points required for fingerprint recognition is extracted from the ridge data of the fingerprint.

In step S74: the extracted fingerprint features (information of the feature points) are compared with the fingerprint features stored in the database are matched one by one to determine whether they are the same fingerprint or not.

In step S75: after the fingerprint matching process is completed, the processing result of the fingerprint recognition is outputted.

In step S706: the fingerprint pressing operation is recognized, and a corresponding level of alarm is triggered according to a duration time or a number of times of the fingerprint pressing.

The fingerprint operation is gently placing the finger and pressing the finger. The system will acquire the image for a plurality of times. Fingerprint in the area is directly selected to acquire the feature points, and fingerprint verification result is returned according to the fingerprint in the background. If the verification is passed, perform the next determination:

(1) determining the pressing duration time, and starting an alarm function of a corresponding level:

when the pressing is continued for 2 s, an alarm is started by automatically sending a positioning message and an emergency voice recording message;

when the pressing is further continued for 3 s, additional alarm is performed by starting the camera to capture the ambient environment and sending the captured video in real time; and when the pressing is further continued for 4 s, additional alarm is performed by to automatically calling several designated emergency contacts.

(2) determining the number of pressing times, and starting an alarm function of a corresponding level:

when the pressing is performed for two times, an alarm is started by automatically sending a positioning message and an emergency voice recording message;

when the pressing is performed for another three times, additional alarm is performed by starting the camera to capture the ambient environment and sending the captured video in real time; and when the pressing is performed for yet another four times, additional alarm is performed by to automatically calling several designated contacts or sending a short message simultaneously to the several designated contacts.

In step S708, the alarm is started according to the alarm level, to invoke different modules to perform the alarm function.

Specifically, GPS positioning is started to perform positioning of the location and send information. The voice recorder is started to automatically record a voice and send information. The camera is started to record video of the environment and information is sent. Calling a plurality of emergency contacts and sending message is automatically initiated according to an order until the calling is put through. A short message is sent simultaneously to all the contacts in the emergency contact list.

It should be noted that the setting of numbers of a plurality of emergency contacts, including add, edit and delete; and mass SMS content settings are required.

In this way, it may be seen that the present alternative embodiment is simple and easy to implement, a fingerprint emergency positioning and alarm method and device are introduced in a mobile terminal device with a fingerprint sensor. The device implements the fingerprint emergency positioning and alarm through signal transmission and processing among the three modules. With the present alternative embodiment, alarm modules of various levels may be triggered in an emergency situation by utilizing the fingerprint recognition function and pressing operation technology of the fingerprint sensor, to achieve positioning and alarm function, and it may bring about excellent user experience.

In yet another embodiment, there is also provided a software for performing the technical solutions described in the above embodiments and preferred embodiments.

In another embodiment, there is also provided a storage medium in which the above-described software is stored, including but not limited to optical disks, floppy disks, hard disks, rewritable memories, and the like.

It will be apparent to those skilled in the art that the above-described modules or steps of the present disclosure may be implemented by a general purpose computing device which may be concentrated on a single computing device or distributed over a network of a plurality of computing devices. Optionally, they may be implemented by program code executable by the computing device, so that they may be stored in a storage device and executed by a computing device. In some cases, they may be executed in a different order from the steps illustrated or described herein, or are separately made into individual integrated circuit modules, or a plurality of modules or steps in them are made into a single integrated circuit module. Thus, the present disclosure is not limited to any particular combination of hardware and software.

The foregoing is merely illustrative of the alternative embodiments of the present disclosure and is not intended to be limiting of the present disclosure. The present disclosure may be modified and varied by those skilled in the art. Any modifications, equivalent substitutions, improvements, and the like within the spirit and principles of the present disclosure are intended to be included within the scope of the present disclosure.

INDUSTRIAL APPLICABILITY

The technical solution provided by the embodiments of the present embodiment is applied in the alarm of the terminal. A pressing operation by a finger corresponding to a first fingerprint at a touch position for recognizing the first fingerprint is received, the first fingerprint matching with a fingerprint previously stored locally in the terminal; and an alarm function of the terminal is triggered when a pressing duration time of the pressing operation reaches a predetermined time period, and/or a number of pressing times of the pressing operation reaches a predetermined number of times. In this way, in the present disclosure, the alarm function of the terminal may be initiatively triggered by the fingerprint recognition. It may solve the problem that the function of the fingerprint recognition is monotonous in the related art, and improve the user experience.

The invention claimed is:

1. An alarm method for a terminal, comprising:
receiving a pressing operation by a finger corresponding to a first fingerprint at a touch position for recognizing the first fingerprint, the first fingerprint matching with a fingerprint previously stored locally in the terminal; and
triggering an alarm function of the terminal when the pressing duration time of the pressing operation reaches a predetermined time period, and/or the number of pressing times of the pressing operation reaches a predetermined number of times;

wherein triggering an alarm function of the terminal when the pressing duration time of the pressing operation reaches a predetermined time period, and/or the number of pressing times of the pressing operation reaches a predetermined number of times, comprises: when the pressing duration time reaches the predetermined time period, depending on the value of the pressing duration time, triggering an alarm function corresponding to the pressing duration time; and/or when the number of the pressing times is greater than the predetermined number of times, depending on the value of the number of the pressing times, triggering an alarm function corresponding to the number of the pressing times;

wherein depending on the value of the pressing duration time, triggering an alarm function corresponding to the pressing duration time, comprises: when the pressing duration time is within a range of a first time period, triggering the terminal to send a current position message and an emergency SOS message to a preset first designated receiving party, and triggering a voice recording function of the terminal; when the pressing duration time is within a range of a second time period, further triggering the terminal to start a camera, and send video information captured by the camera to the designated receiving party;

wherein depending on the value of the number of the pressing times, triggering an alarm function corresponding to the number of the pressing times, comprises: when the number of the pressing times is within a range of a first threshold, triggering the terminal to send a current position message and an emergency SOS message to a preset first designated receiving party, and triggering a voice recording function of the terminal; when the number of the pressing times is within a range of a second threshold, further triggering the terminal to start a camera, and send video information captured by the camera to the designated receiving party.

2. The method according to claim 1, wherein depending on the value of the pressing duration time, triggering an alarm function corresponding to the pressing duration time, comprises:

when the pressing duration time is within a range of a third time period, further triggering the terminal to send current position messages and emergency SOS messages to a plurality of preset designated receiving parties.

3. The method according to claim 1, wherein depending on the value of the number of the pressing times, triggering an alarm function corresponding to the number of the pressing times, comprises:

when the number of the pressing times is within a range of a third threshold, further triggering the terminal to send current position messages and emergency SOS messages to a plurality of preset designated receiving parties.

4. The method according to claim 1, wherein prior to triggering the alarm function of the terminal, the method comprises:

when the pressing duration time of the pressing operation reaches the predetermined time period, and/or the number of pressing times of the pressing operation reaches the predetermined number of times, prompting the user whether to proceed the pressing operation by a predetermined operation.

5. An alarm device for a terminal, comprising:
a receiving module configured to receive a pressing operation by a finger corresponding to a first fingerprint at a touch position for recognizing the first fingerprint, the first fingerprint matching with a fingerprint previously stored locally in the terminal; and
an alarm module configured to trigger an alarm function of the terminal when the pressing duration time of the pressing operation reaches a predetermined time period, and/or the number of pressing times of the pressing operation reaches a predetermined number of times;
wherein the alarm module is further configured to, when the pressing duration time reaches the predetermined time period, depending on the value of the pressing duration time, trigger an alarm function corresponding to the pressing duration time; and/or when the number of the pressing times is greater than the predetermined number of times, depending on the value of the number of the pressing times, trigger an alarm function corresponding to the number of the pressing times;
wherein the alarm module comprises: a first alarm unit configured to, when the pressing duration time is within a range of a first time period, trigger the terminal to send a current position message and an emergency SOS message to a preset first designated receiving party, and trigger a voice recording function of the terminal; a second alarm unit configured to, when the pressing duration time is within a range of a second time period, further trigger the terminal to start a camera, and send video information captured by the camera to the designated receiving party; and/or
wherein the alarm module comprises: a first alarm unit configured to, when the number of the pressing times is within a range of a first threshold, trigger the terminal to send a current position message and an emergency SOS message to a preset first designated receiving party, and trigger a voice recording function of the terminal; when the number of the pressing times is within a range of a second threshold, further trigger the terminal to start a camera, and send video information captured by the camera to the designated receiving party.

6. The device according to claim 5, wherein the alarm module comprises:
a third alarm unit configured to, when the pressing duration time is within a range of a third time period, further trigger the terminal to send current position messages and emergency SOS messages to a plurality of preset designated receiving parties.

7. The device according to claim 5, wherein the alarm module comprises:
a fourth alarm unit configured to, when the number of the pressing times is within a range of a first threshold, trigger the terminal to send a current position message and an emergency SOS message to a preset first designated receiving party, and trigger a voice recording function of the terminal;
a fifth alarm unit configured to, when the number of the pressing times is within a range of a second threshold, further trigger the terminal to start a camera, and send video information captured by the camera to the designated receiving party; and
a sixth alarm unit configured to, when the number of the pressing times is within a range of a third threshold, further trigger the terminal to send current position messages and emergency SOS messages to a plurality of preset designated receiving parties.

8. The device according to claim 5, wherein prior to triggering the alarm function of the terminal, the device further comprises:
   a prompt module configured to, when the pressing duration time of the pressing operation reaches the predetermined time period, and/or the number of pressing times of the pressing operation reaches the predetermined number of times, prompt the user whether to proceed the pressing operation by a predetermined operation.

* * * * *